Dec. 22, 1959 C. E. LOMAX 2,918,531

CONNECTOR SUPERVISORY CIRCUIT

Filed April 12, 1957 3 Sheets-Sheet 1

INVENTOR.
CLARENCE E. LOMAX
BY
Smith, Olsen, Baird and Miller
ATTY.

Dec. 22, 1959 C. E. LOMAX 2,918,531

CONNECTOR SUPERVISORY CIRCUIT

Filed April 12, 1957 3 Sheets-Sheet 2

INVENTOR.
CLARENCE E. LOMAX
BY Smith, Olsen, Baird and Miller
ATTY.

Dec. 22, 1959 C. E. LOMAX 2,918,531

CONNECTOR SUPERVISORY CIRCUIT

Filed April 12, 1957 3 Sheets-Sheet 3

INVENTOR.
CLARENCE E. LOMAX
BY
Smith, Olsen, Baird and Miller
ATTY.

United States Patent Office 2,918,531

Patented Dec. 22, 1959

2,918,531

CONNECTOR SUPERVISORY CIRCUIT

Clarence E. Lomax, Hastings, Nebr., assignor to General Telephone Laboratories, Incorporated, Chicago, Ill., a corporation of Delaware Application April 12, 1957, Serial No. 652,475

4 Claims. (Cl. 179—8.5)

The present invention relates to automatic telephone systems and particularly to a supervisory circuit for use with the connector equipment in an exchange.

An object of the present invention is to provide for groups of connectors a supervisory circuit which is responsive to an alarm condition in any one of the connectors for operating a visual alarm and to indicate the alarm condition for operating another visual alarm to identify the group in which the alarm condition exists and for operating an audible emergency alarm when the alarm condition is an emergency and when the alarm condition is of the non-emergency type but is sustained for a predetermined period.

A further object of the invention is to provide a supervisory circuit for groups of connectors in an exchange for registering the number of times and the duration of the periods for which each of the groups of connectors are busy and to register the duration of the periods for which all of the connectors in the exchange are busy and to operate an alarm when a group busy condition is sustained for a predetermined period.

Further features of the invention pertain to the particular arrangement of the circuit elements in the supervisory circuit, whereby the above-outlined and additional operating features thereof are attained.

Figure 1:
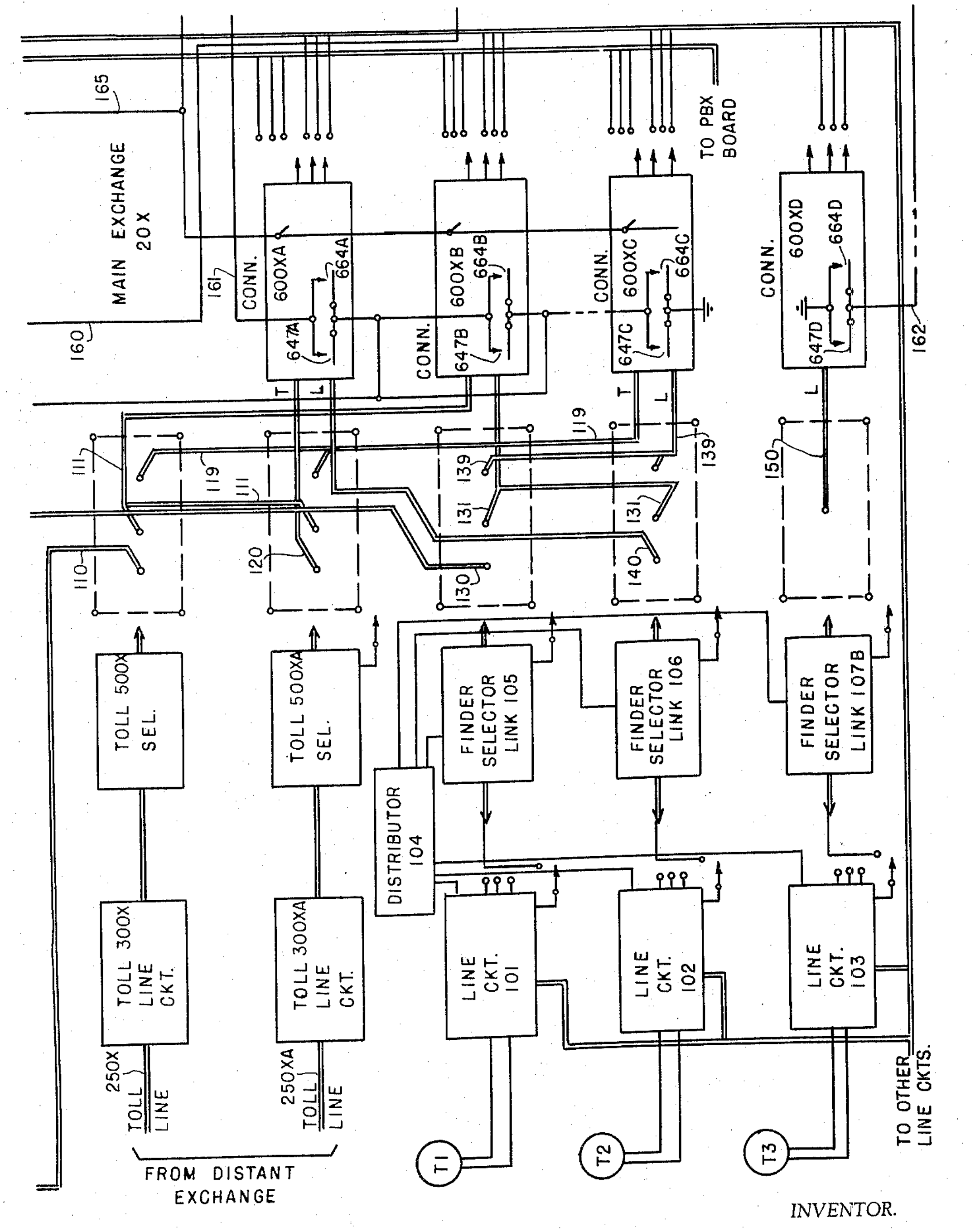
Figure 2:
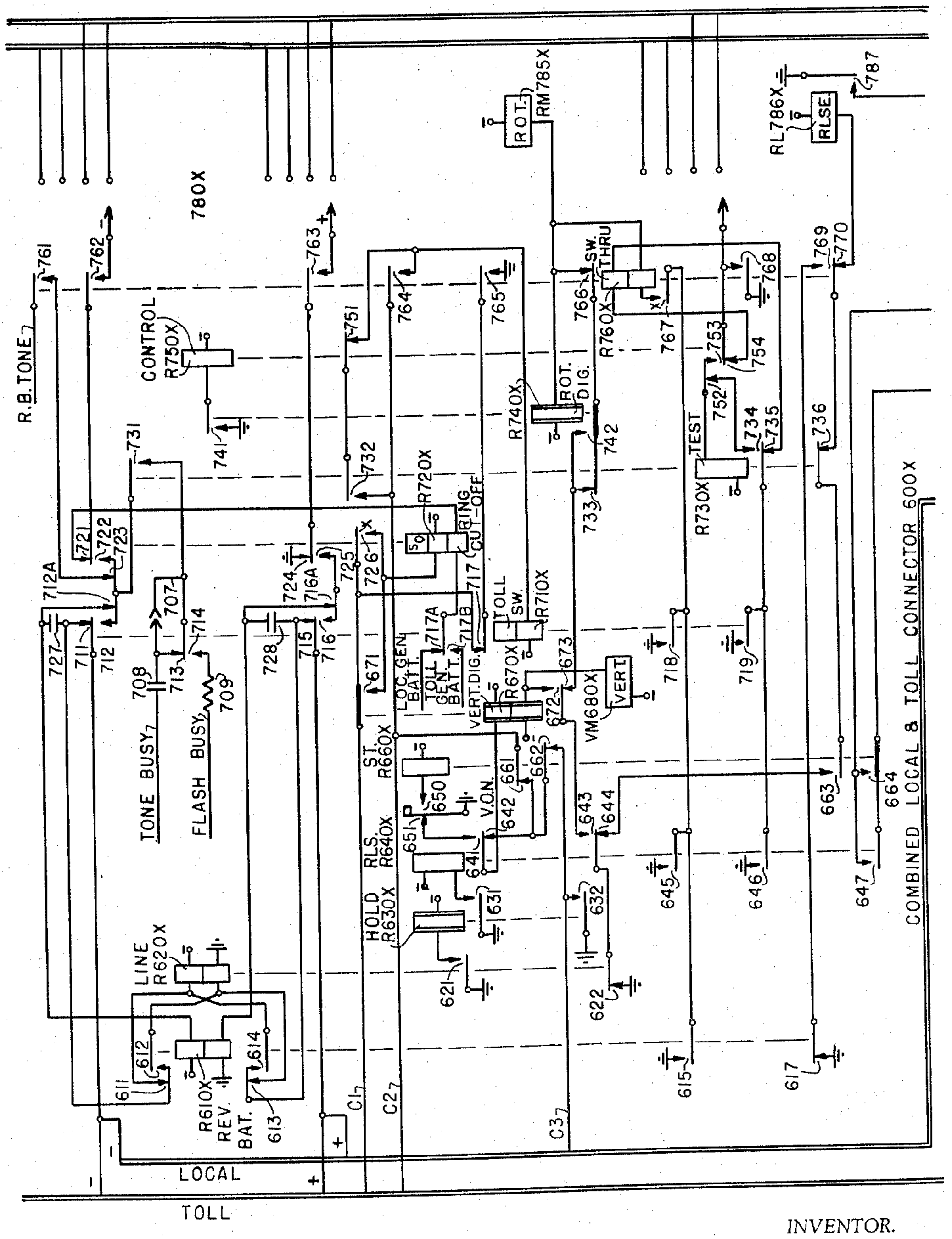
Figure 3:
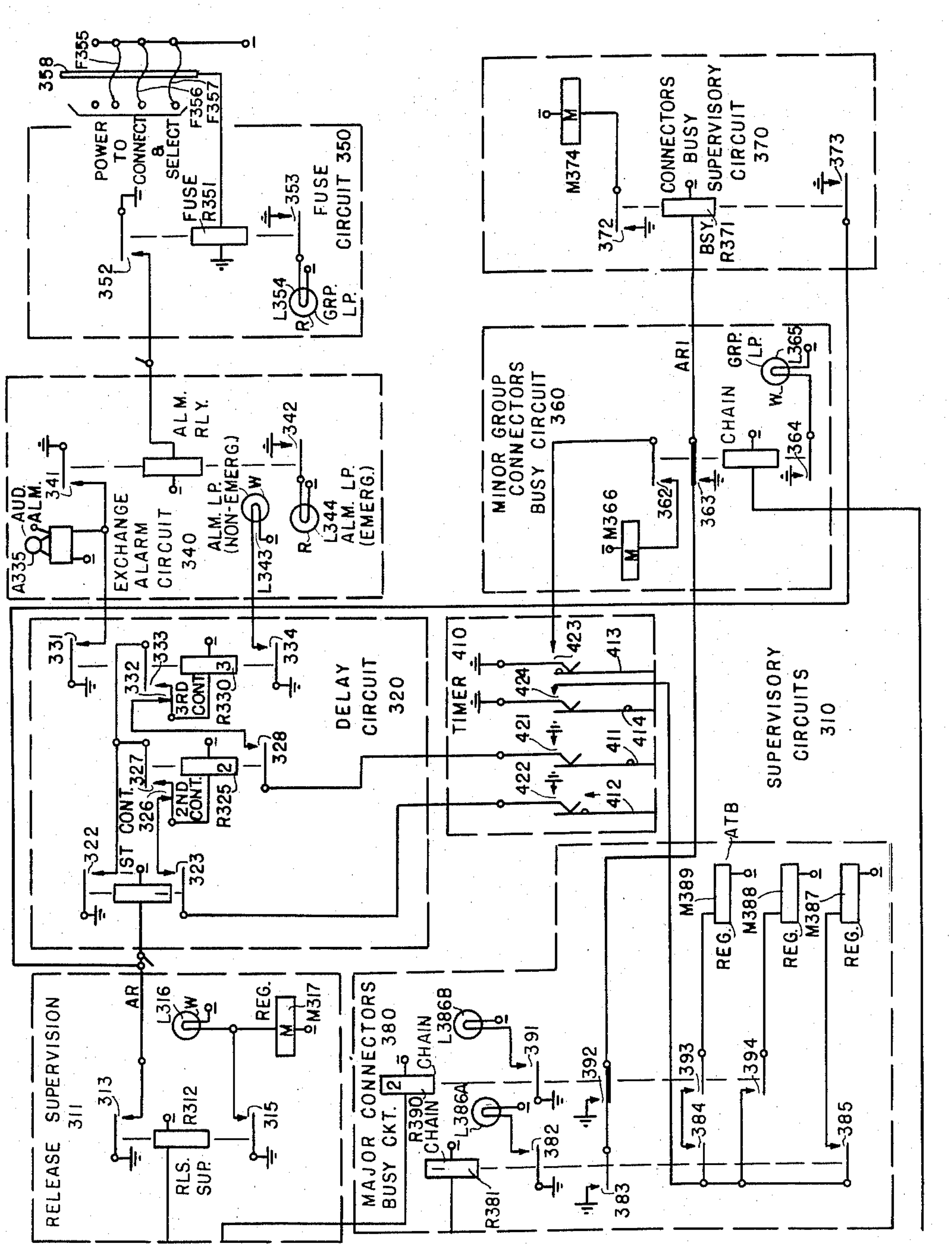

The invention, both as to its organization and method of operation, together with further objects and advantages thereof, will be best understood by reference to the following specification taken in conjunction with the accompanying drawings, in which:

Figures 1 to 3, inclusive, taken together illustrate a selector-connector arrangement in a telephone exchange which is adapted to serve both toll lines and local lines in the exchange and which has associated therewith a supervisory circuit in accordance with the invention.

Considering now the telephone system, and referring specifically to Figs. 1 and 2, the exchange arrangement shown therein is substantially identical to the exchange arrangement shown in the copending application of Clarence E. Lomax, Serial No. 550,386, filed December 1, 1955, now Patent No. 2,801,286, granted July 30, 1957, and insofar as the circuits of the present arrangement correspond to the circuits of the Lomax application, the present circuits have been given the same numerical characters as employed in the Lomax application with the suffix "X" added thereto.

Specifically, and referring to Fig. 1, there is shown therein a main exchange 20X which corresponds to the main exchange 20 of the Lomax application. Included in the main exchange 20X is a plurality of subscriber stations, including the subscriber stations T1, T2 and T3, the associated subscriber lines of which are terminated in individually associated line circuits including the line circuits 101, 102 and 103. There is also included in the main exchange a plurality of finder-selector links including the finder-selector links 105, 106 and 107, each of which has access to all of the line circuits in the exchange and is rendered operative from a distributor 104 associated with the line circuits for seizing a calling one of the subscriber lines.

In addition, the main exchange 20X is provided with a plurality of toll line circuits, including the toll line circuits 300X and 300XA, each terminating a toll line, including the toll lines 250X and 250XA, incoming from a distant exchange. The toll line circuits 300X, etc., are connected to corresponding toll selectors including the toll selectors 500X and 500XA. Each of the toll selectors 500X, etc., and the finder selector links 105, etc., are of the Strowger type provided with multiple point wipers and associated contact banks, wherein the contact banks terminate connections extending to groups of connectors including the connectors 600X, 600XA, 600XB, 600XC and 600XD. Each of the connectors 600XA, 600XB and 600XC is identical to the connector 600X shown in detail in Fig. 2 and is adapted to be responsive to a local call initiated in the main exchange or a toll call incoming to the main exchange, and to extend the calling connection to either a P.B.X board (not shown) included in the main exchange or to subscriber stations in the main exchange. The connectors 600X, 600XA, 600XB and 600XC are in a major group of connectors which are accessible to the toll selector 500X and 500XA into the finder selector links 105 and 106, wherein the connector 600X is the first choice connector for the toll selector 500X and for the finder-selector link 105, the connector 600XA is the first choice connector for the toll selector 500XA and the finder-selector link 106, and the connectors 600XB and 600XC are second, or last, choice connectors for the mentioned toll selectors and finder-selector links. The connector 600XD is one of a plurality of connectors in a minor group, each of which may be identical to the connector 600X but which is accessible only to a group of finder-selector links including the finder-selector link 107 and which has access only to the subscriber lines in the main exchange. In the last named group of connectors none of the connectors thereof are designated as choice connectors.

The first choice connector 600X is connected in parallel with the first choice connectors 600XA to a chain circuit extending in series through the last choice connectors of the major group including the connectors 600XB and 600XC. The minor group of connectors including the connector 600XD are all connected in a series chain circuit.

Referring now to Fig. 3 the supervisory circuits 310 shown therein include a release supervision circuit 311 individual to the major group of connectors and connected in multiple to each of the connectors of the group, a time delay circuit 320 operative from a group of circuits including the release supervision circuit 311, a fuse circuit 350 individual to the major group of connectors and selectors having access thereto and operative responsive to a blown fuse in the mentioned group of connectors or associated selectors, and an alarm circuit 340 operative from the delay circuit 320 and from the fuse circuit 350. In addition there is provided a minor group connector busy circuit 360 which is responsive to the busy condition of all of the connectors in the minor group including the connector 600XD for registering the duration of the connectors busy condition, a major group connector busy circuit 380 responsive to the busy condition of all of the last choice connectors and of either and both first choice connectors in the major group including the connector 600X for registering the duration of each of busy condition, and a connectors busy supervisory circuit 370 operative from both the major connectors busy circuit 380 and the minor connectors busy circuit 360 for recording the number of times that all of the connectors in either group of connectors were busy. In addition the supervisory circuits 310 of Fig. 3 is provided with a timer unit 410 which selectively operates certain of the circuits therein for producing a record of the duration over which any condition may exist in a circuit.

Considering now the structure of the circuits included in the arrangement, the toll line circuits including the toll line circuit 300X are each identical to the toll line circuit 300 shown in detail in the above mentioned Lomax application, and the toll selectors including the toll selector 500X is identical to the toll selector 500 shown in the above identified Lomax application. The line circuits including the line circuits 101, the distributor 104 and the finder-selector links, including the finder selector link 105, are all of conventional structure and arrangement. The connectors 600XA, 600XB, 600XC and 600XD are identical to the connector 600X shown in detail in Fig. 2. The connector 600X is substantially identical to the combined local and toll connector 600X shown in the Lomax application as indicated by the suffix "X" added to the numerical identity characters of the elements shown in the circuit. Specifically, the connector 600X is provided with a relay group including a reverse battery relay R610X, a line relay R620X, a hold relay R630X, a release relay R640X, a start relay R660X, a vertical digit relay R670X, a toll switching relay R710X, a ring cut-off relay R720X, a test relay R730X, a rotary digit relay R740X, a control relay R750X, and a switch-through relay R760X. In addition there is provided a vertical magnet VM680X and a rotary magnet RM785X for operating the Strowger switching apparatus associated with the connector 600X, respectively, in the vertical and rotary direction. Additionally, the connector 600X is provided with a release magnet RL786X for restoring the switching apparatus to its home position. The structure of the connector 600X differs from the structure of the connector 600 in the Lomax application only by the inclusion of contacts 647, 664 and 787 which are closed, respectively, responsive to the operation of the release relay R640X, the start relay R660X, and the release magnet RL786X. The contacts 647 and 664 are connected in multiple in the previously mentioned chain circuit 160 extending from the major connectors busy circuit 380 and to ground potential through the "last choice" connectors 600XB, etc., of the major connector group to ground potential. The contacts 787 are associated with the multiple release circuit 165, previously mentioned, extending to the release supervision circuit 311.

The release supervision circuit 311 includes a release supervisory relay R312, a group lamp L316, and a peg-count meter M317, the latter two of which are operative in multiple from the relay R312. The delay circuit 320 includes a first control relay R321, and second control relay R325, and a third control relay R330, selectively operative in chain and in accordance with the control furnished thereto from the timer unit 410. The alarm circuit 340 is provided with an audible alarm device A335, an alarm relay R341, an alarm lamp L343 which illuminates to a white color to indicate a non-emergency alarm condition, and an alarm lamp L344 which illuminates to a red color to indicate an emergency alarm condition. The fuse circuit 350 includes a fuse relay R351 and a group lamp L354 which illuminates to a red color to indicate an emergency condition existing in the group of connectors and selectors served by the fuse circuit 350. The fuse circuit 350 serves a plurality of fuses, including the fuses F355, F356 and F357, which are individual to the connectors in the group of connectors 600X to 600XC, inclusive, and to the selectors including the toll selector 500X and the 500XA and the finder-selector links 105 and 106. The fuse arrangement is provided with the fuse strip 358 at which a circuit is completed responsive to a blown fuse in the group.

The minor group connectors busy circuit 360, associated with the group of connectors including the connector 600XD, is provided with a chain relay R361, a group lamp L365 which is illuminated to a white color to indicate a non-emergency busy situation in the group, and a peg-count meter M366 which is selectively operative from the chain relay R361 under control of the timer unit 410 for the purpose of recording the duration of any group busy condition arising in the associated group of connectors. The major group connectors busy circuit 380, associated with the group of connectors 600X to 600XC, inclusive, is provided with a chain relay R381 and a chain relay R390, a group lamp L386A which is operative from the relay R381, a group lamp L386B which is operative from the relay R390, both of which are illuminated to a white color to indicate a non-emergency busy condition peg-count meters M387, M388 and M389 which are selectively operative responsive, respectively, to the operation of the relay R381 to the operation of the relay R390, and to the joint operation of the relays R381 and R390 and under control of the timer unit 410. The connectors busy supervisory circuit 370 is provided with a busy relay R371 and a peg-count meter M374 operated responsive to the operation of the relay R371 for counting the number of times that the connectors busy circuits 360 and 380 register group busy conditions. The timer unit 410 is provided with a plurality of timer discs 411, 412, 413 and 414 which are continuously operative in cycles for the purpose of providing marking potentials to individually associated circuits at selected time intervals.

Considering now the operation of the supervisory circuits 310 in providing supervision for the connectors and selectors in the main exchange 20X, it is first necessary to appreciate the mode of operation of the connectors 600X, etc. A detailed explanation of the operation of the connector 600X is given in the Clarence E. Lomax application, Serial No. 550,386, filed December 1, 1955, so that in the present circumstance the operation will be considered only insofar as it is necessary to explain the operation of the supervisory circuits. Specifically, responsive to the seizure of the connector 600X by either the toll selector 500X or the finder-selector link 105 a group of relays including the release relay R640X is operated to close at its contacts 647 one point in a chain circuit extending from battery potential via the chain relay R381 of the major connectors busy circuit 380, contacts 647 and 664, 647B and 664B, and 647C and 664C to ground potential. Thereafter, responsive to the transmission thereto of digit impulses, the Strowger switch 780X is selectively operated in the vertical and rotary direction to select a corresponding contact in the associated contact banks. Responsive to the stepping of the Strowger switch 780X in the vertical direction, the vertical off-normal contacts 652 are closed whereupon the start relay R660X is operated to close at its contacts 664 a further point in the above traced chain circuit. The release relay R640X and the start relay R660X are retained operated during the calling period so that the contacts 647 and 664 in the chain circuit 160 are closed. Assuming that the connector 600X is the only connector of the group including the connector 600X, 600XB and 600XC, that is operated at this time, the chain circuit 160 is incomplete so that the chain relay R381 is not operated.

As explained in the above mentioned Lomax application, the connector 600X is of the last-party-to-release type and responsive to the last party in a calling connection interrupting the connection to the connector 600X, a group of relays including the line relay R620X and the release relay R640X are restored and the start relay R660X is retained operated, so that a circuit is completed from ground potential via the contacts 622, 644, 663, 736 and 770 through the winding of the release magnet RL786X to battery potential. Thereupon the release magnet RL786X operates to restore the Strowger switch 780X to its home position. When the Strowger switch 780X is restored to its normal home position the vertical off-normal switch 650 is operated to open the contacts 652 for restoring the start relay R660X, whereupon the operating circuit for the magnet RL786X is interrupted at the contacts 663 and the contacts 664 in the chain circuit 160 are open.

The release magnet RL786X upon operating closes at its contacts 787 ground potential to the release circuit 165 extending through the upper winding of the release supervisory relay R312 in the release supervision circuit 311. Assuming normal operation of the connector 600X the release magnet RL786X is restored a short time thereafter by the interruption of the operating circuit therefor at the contacts 663 so that the operating circuit for the relay R312 and the release supervision circuit 311 is interrupted at the contacts 787.

In the release supervision circuit 311, responsive to the application of ground potential to the release circuit 165, the relay R312 is operated to close at its contacts 315 ground potential to the lamp L316 and to the peg-count meter M317, whereupon the latter registers a count in order to indicate the number of times that the connectors in the group 600X to 600XC, inclusive, are operated. At the same time the relay R312 completes at the contacts 313 an obvious circuit for operating the first control relay R321 and the delay circuit 320. Upon operating the first control relay R321 closes its contact 322 for extending operating ground potential to the control relays R325 and R330. In addition the relay R321 closes its contacts 323 so that responsive to the closing of the contacts 422 by the timer disc 412 of the timer unit 410, ground potential is extended via the contacts 323 and 326 through the winding of the relay R325 to battery potential whereupon the latter relay operates. Upon operating the relay R325 completes at its contacts 327 a circuit extending from ground potential via the contacts 322 for maintaining the latter relay operated. In addition the relay R325 closes its contact 328 so that a short time thereafter when the timer disc 411 closes contacts 421, ground potential is extended via the contacts 421, 328 and 332 to the winding of the third control relay R330 to battery potential, whereupon the latter relay operates. Upon operating the relay R330 closes its contacts 333 for completing a circuit extending from ground potential via the contacts 322 in order to retain the relay R330 operated. In addition, the relay R330 closes contacts 331 for extending operating ground potential to the audible alarm A335 in the alarm circuit 340 and closes contacts 334 for extending operating ground potential to the alarm lamp L343, whereupon the latter is illuminated in a white color. In this circumstance the audible alarm A335 is operated, the alarm lamp L343 is illuminated and the group lamp L316 is illuminated, so that an attendant in the exchange is rendered an audible alarm so that an alarm situation exists in the exchange, a visual indication by the illumination of the lamp L343 that the alarm is of the non-emergency type and a visual indication by the illumination of the lamp L316 that the non-emergency alarm condition exists in the release mechanism of one or more of the connectors in the group 600X to 600XC, inclusive. Thereupon the attendant may take proper steps to correct the alarm situation.

Assuming now that the connector 600X is operated in a normal fashion in releasing so that the relay R312 is operated and promptly restored, the relay R321 is operated and restored and only if the timer disc 412 should be so positioned to close contacts 422 during the operational period of the relay R321 will the relay R325 be operated. However, for normal release operation of the connectors, in no circumstance will the relay R330 be operated so as to render an audible and visual alarm signal.

Considering now the circumstance in which the connector 600X is operated and all of the last choice connectors of the associated group including the connectors 600XB and 600XC are busy, a circuit is completed from ground potential via the contacts 647C and 664C, 647B and 664B, 647 and 664, through the winding of the chain relay R381 to battery potential, whereupon the latter relay operates. Upon operating the relay R381 closes at its contacts 382 a circuit for illuminating the group lamp L386A, closes its contacts 383 to complete a circuit extending to the winding of the busy relay R371 in the connectors busy supervisory circuit 370, and closes contacts 385 for preparing a circuit to operate the peg-count meter M387. The busy relay R371 upon operating closes at its contacts 372 a circuit for operating the peg-count meter M374 whereby a count is made of the circumstance that a busy condition occurred in one of the groups of connectors in the exchange. In addition, the relay R371 closes at its contact 373 a circuit extending from ground potential for operating the first control relay R321 in the delay circuit 320.

Assuming that the above described connectors busy condition is sustained for a substantial period, the peg-count meter M387 is operated from a circuit extending from ground potential at the contacts 424 associated with the timer disc 414 and via the contacts 385 to register a count corresponding to each cycle of the timer disc 414 of the timer unit 410, whereby the meter M387 actually records the total time during an operational period of the exchange that the group of connectors including the connector 600X and the connectors 600XB and 600XC are busy. The busy relay R371 in the connectors busy supervisory circuit 370 is retained operated during this period so that ground potential extended via the contact 373 operates the relays R321, R325, and R330, successively, in the manner as previously explained, so that the audible alarm A335 is operated and the alarm lamp L343 is illuminated. In this manner an attendant in the main exchange is rendered an indication by the audible alarm that an alarm circumstance exists in the main exchange, is rendered an indication by the illumination of the alarm lamp L343 that the alarm circumstance is of the non-emergency type, and is rendered an indication by the illumination of the lamp L386A that the non-emergency alarm condition is due to all of the last choice connectors and the first choice connector 600X in the group of connectors 600X to 600XC, inclusive, being busy. The attendant may thereupon check to see if the busy condition is due to a faulty operating condition in one or more of the connectors or due to a high traffic load condition. Thereafter, when any one of the connectors in the busy group is released the previously traced chain circuit 160 is interrupted whereupon the operated relays in the major connect busy circuit 380, the connectors busy supervisory circuit 370 and the delay circuit 320 are restored to normal and the alarm condition nullified.

Considering now the circumstance in which all of the last choice connectors including the connector 600XB and 600XC and the first choice connector 600XA is busy, the chain circuit 161 is completed so that the chain relay R390 in the major connectors busy circuit 380 is operated. Upon operating the relay R390 completes at the contacts 391 a circuit for illuminating the group lamp L386B, closes contact 392 for applying ground potential to the busy relay R371 in the connectors busy supervisory circuit 370 and prepares at the contacts 394 a circuit for operating the peg-count meter M388. Assuming that connector busy condition is sustained for a substantial period, the peg-count meter M388 is operated once during each cycle of the timer disc 414 to record a busy period for the group of connectors associated with the chain circuit 161, and the connectors busy supervisory circuit 370, the delay circuit 320 and the alarm circuit 340 are operated in a manner as explained above with regards to the operation of the chain relay R381. When any one of the connectors associated with the chain circuit 161 is released and becomes idle, the chain circuit is interrupted so that the relay R390 restores and all of the relays operated therefrom in the supervisory circuit 370 and the delay circuit 320 are restored to nullify the alarm operation.

Assuming now that all of the connectors of the group 600X to 600XC are busied, both of the chain circuits 160 and 161 will be completed so that the relays R381 and R390 in the connectors busy circuit 380 are operated. Thereupon the group lamps L386A and L386B are illuminated in a manner as previously explained and the busy relay R371 of the connectors busy supervisory circuit 370 is operated; a circuit is prepared at the contacts 385 for operating the peg-count meter M387; a circuit is prepared at the contacts 394 for operating the peg-count meter M388, and a circuit is prepared at the contacts 384 and 393 for operating the peg-count meter M389. Assuming that this connectors busy condition is sustained for a substantial length of time the peg-count meters M387, M388 and M389 are each operated during each cycle of the timer disc 414 to record therein the duration of the connectors busy condition. Additionally, the connectors busy supervisory circuit 370, the delay circuit 320 and the alarm circuit 340 are operated in a manner as previously explained to render an audible and a visual alarm indication of the non-emergency busy condition of all of the connectors in the group 600X to 600XC, inclusive.

In the arrangement of the major connectors busy circuit 380, the peg-count meter M387 actually registers the number of cycles through which the disc timer 414 operates during the interval that the connector is associated with the chain circuit 160 is busy; the peg-count meter M388 registers the number of cycles through which the timer disc 414 operates during the busy interval of the connectors associated with the chain circuit 161; and the peg-count meter M389 registers the numbers of cycles through which the timer disc 414 operates during the interval when the connectors associated with both of the chain circuits 160 and 161 are busy. Inasmuch as the time-lapse for each cycle of the timer disc 414 is known, the total busy time for each of the above described circumstances can be determined for a given operational period of the exchange from the recorded count in the peg-count meters M387, M388 and M389. In this manner a determination may be made of the traffic load distribution through this group of connectors in the exchange.

The connector 600XD is considered to be one of a group of connectors less in number than that group considered above and inasmuch as its operational duties are with regard to local calls only, and not with regard to toll calls, supervision requirements therefore are somewhat less exacting. However, the group of connectors including the connector 600XD has associated therewith a chain circuit 162 extending from ground potential via the contacts 647D and 664D in the connectors 600XD and through similar contacts in the others of the connectors in the group (not shown) to the chain relay R361 in the minor group connectors busy circuit 360. Responsive to all of the connectors in the group including the connectors 600XD being rendered busy, ground potential is extended via the chain circuit 162 for operating the chain relay R361. Upon operating the relay R361 closes at contacts 363 a circuit for operating the busy relay R371 in the connectors busy circuit 370 and completes at the contacts 364 a circuit for illuminating the group lamp L365. Additionally, the relay R361 prepares at the contacts 362 a circuit for operating the peg-count meter M366 from the timer disc 413 of the timer unit 410. Assuming that the group busy condition exists in the group of connectors including the connector 600XD for a substantial length of time, the peg-count meter M366 is operated to register a count for each cycle of operation of the timer disc 413 in order thereby to record the duration of the busy periods of the associated group of connectors. The busy relay R371 is also maintained operated for that same period so that the contacts 373 are closed to cause the delay circuit 320 and the alarm circuit 340 to be operated in a manner as previously explained. Responsive to the operation of the audible alarm A335, the illumination of the alarm L343 and the illumination of the group lamp L365, the attendant in the exchange is rendered an audible indication of an alarm condition and a visual indication that the alarm condition is of the non-emergency type and due to a group busy condition in the minor group of connectors including the connector 600XD.

From the foregoing explanation it is clear that the connectors busy supervisory circuit 370 registers a count for each time that a group of connectors in the exchange is registered busy and that the peg-count meters M366, M387, M388 and M389 effectively measure the duration of the busy conditions in the respectively associated groups of connectors. From the registrations in the connectors busy supervisory circuit 370 and the minors connectors busy circuit 360 and major connectors busy circuit 380 a substantial approximation may be made of the number of times and the average duration for which each of the associated groups of connectors were rendered busy.

Considering now the operation of the fuse circuit 350, as previously pointed out the circuit is associated with the fuses that serve the connectors in the group including the connectors 600X to 600XC, inclusive, and the selectors having access thereto. Responsive to any one of these fuses F355, etc., being blown a circuit is extended from battery potential via the fuse conductor 358 and the winding of the fuse relay R351 to battery potential. Thereupon, the relay R351 operates to close at its contact 352 a circuit extending to the alarm relay R341 in the alarm circuit 340. In addition, the relay R351 closes at contacts 353 a circuit for illuminating the group lamp L354 which is illuminated to a red color to indicate an emergency alarm condition. The relay R341 in the alarm circuit 340, upon operating closes its contacts 341 for operating the audible alarm A335 and closes its contacts 342 for illuminating the alarm lamp 344 which illuminates to a red color to indicate an emergency alarm condition. Thereupon, the attendent in the exchange is rendered an audible indication that an alarm condition exists in the exchange, a visual indication that the alarm condition is of the emergency type, and that the emergency alarm condition exists in the group of fuses served by the fuse circuit 350. Accordingly, the attendant is put on notice to find and repair a blown fuse in the designated group of fuses.

In view of the foregoing it is apparent that there has been provided a supervisory circuit for connectors in an exchange which renders alarms responsive to the failure of any one of the connectors to release, renders an alarm responsive to any group of connectors being rendered busy for a substantial length of time, renders an alarm responsive to operating battery potential being cut off from any one of the connectors in a group and registers the number of times and the duration that groups of connectors in the exchange have been rendered busy.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an automatic telephone system, a plurality of lines, a group of switching units accessible to calling ones of said lines and selectively operative to complete connections to called ones of said lines, a busy relay operative in response to a busy condition of said group of switching units, a time register controlled by said busy relay and operative throughout the total time interval of operation of said busy relay so as to register the total time interval of a busy condition of said group of switching units, a control relay operative in response to operation of said busy relay, a count register operative in response to each operation of said control relay so as to register the total number of times of a busy condition of said group of switching units, an alarm unit operative into a second state to indicate a sustained busy condition of said group of switching units, means responsive to operation of said control relay for operating said alarm unit into a first state, and timing means responsive to operation of said alarm unit into said first state throughout a predetermined time interval for operating said alarm unit into said second state.

2. In an automatic telephone system, a plurality of lines, a plurality of groups of switching units accessible to calling ones of said lines and selectively operative to complete connections to called ones of said lines, a corresponding plurality of busy relays respectively associated with said groups of switching units, each of said busy relays being operative in response to a busy condition of the associated group of switching units, a corresponding plurality of time registers respectively corresponding to said group of switching units and respectively controlled by said busy relays, each of said time registers being operative throughout the total time interval of operation of the corresponding busy relay so as to register the total time interval of a busy condition of the corresponding group of switching units, a control relay operative in response to operation of any one of said busy relays, a count register operative in response to each operation of said control relay so as to register the total number of times of busy conditions of said groups of switching units, an alarm unit operative into a second state to indicate a sustained busy condition of any one of said groups of switching units, means responsive to operation of said control relay for operating said alrm unit into a first state, and timing means responsive to operation of said alarm unit into said first state throughout a predetermined time interval for operating said alarm unit into said second state.

3. In an automatic telephone system, a plurality of lines, a plurality of groups of switching units accessible to calling ones of said lines and selectively operative to complete connections to called ones of said lines, a corresponding plurality of busy relays respectively associated with said groups of switching units, each of said busy relays being operative in response to a busy condition of the associated group of switching units, a corresponding plurality of time registers respectively corresponding to said group of switching units and respectively controlled by said busy relays, each of said time registers being operative throughout the total time interval of operation of the corresponding busy relay so as to register the total time interval of a busy condition of the corresponding group of switching units, a control relay operative in response to operation of any one of said busy relays, a count register operative in response to each operation of said control relay so as to register the total number of times of busy conditions of said groups of switching units, a pulse generator providing first cyclically repeated timing pulses and second cyclically repeated timing pulses, wherein said first and second timing pulses are non-concurring and are at the same time rate, a first alarm relay responsive to operation of said control relay and operated by one of said first timing pulses and maintained operated thereafter by said operated control relay, a second alarm relay responsive to operation of said first alarm relay and operated by one of said second timing pulses and maintained operated thereafter by said control relay and an alarm device operated in response to operation of said second alarm relay to render an alarm signal indicative of a sustained busy condition of one of said groups of switching units.

4. In an automatic telephone system, a first group of lines, a second group of lines, a first switching unit common to said first group of lines and accessible to a calling line therein as a first choice route for the extension of a connection therefrom, a second switching unit common to said second group of lines and accessible to a calling line therein as a first choice route for the extension of a connection therefrom, a group of third switching units common to said first and second groups of lines and accessible to calling lines therein as second choice routes for the extension of connections therefrom, a first busy relay operative in response to a conjoint busy condition of said first switching unit and of each of said third switching units, a second busy relay operative in response to a conjoint busy condition of said second switching unit and of each of said third switching units, a first time register operative throughout the total time interval of operation of said first busy relay so as to register the total time interval of the corresponding conjoint busy condition of said first switching unit and of each of said third switching units, a second time register operative throughout the total time interval of operation of said second busy relay so as to register the total time interval of the corresponding conjoint busy condition of said second switching unit and of each of said third switching units, and a third time register operative throughout the total time interval of the conjoint operations of said first and second busy relays so as to register the total time interval of the corresponding conjoint busy condition of said first switching unit and said second switching unit of each of said third switching units.

References Cited in the file of this patent

UNITED STATES PATENTS

| | | |
|---|---|---|
| 1,194,378 | Goodrum | Aug. 15, 1916 |
| 2,328,750 | Smith et al. | Sept. 7, 1943 |
| 2,393,403 | Ostline | Jan. 22, 1946 |
| 2,763,725 | Ostline | Sept. 18, 1956 |